Nov. 24, 1936.  E. J. KILEY  2,061,706

VALVE

Filed Oct. 11, 1934

EDWARD J. KILEY
INVENTOR

BY Leon T. Hooper
ATTORNEY

Patented Nov. 24, 1936

2,061,706

UNITED STATES PATENT OFFICE 2,061,706

VALVE

Edward J. Kiley, Hammond, Ind., assignor to Hammond Brass Works, Hammond, Ind., a corporation of Indiana Application October 11, 1934, Serial No. 747,849

5 Claims. (Cl. 251—48)

This invention relates to an improvement in valves of the type used for controlling the flow of hot and cold fluids, and has for one of its principal objects the provision of means for preventing leakage around the stem by a simple and easily removable sealing member.

Another and still further object of this invention resides in the provision of means for associating the tapered portion of a valve stem with the correspondingly tapered seat of a sealing member.

Still another and further object of the valve of this invention resides in the provision of means for maintaining the sealing surfaces in fluid tight relation regardless of wear on the sealing member.

A still further object of this invention resides in the construction of the recessed apertured fitting, which encircles the stem closely at the top, but is tapered to allow the large portion of the stem to enter the lower part of the aperture.

An additional object of this invention resides in the fact that the sealing member is easily replaced, but need not be replaced until the tapered seat on the stem has worn entirely through it.

Another important object of the valve of this invention resides in the production of an improved article composed of a limited number of sturdy parts, which are easily assembled or taken apart, amenable to low cost of manufacture, dependable, and has a longer life than prior constructions.

Another object is to provide a novel construction in the nature of an improvement over my former valve set forth in United States Letters Patent No. 1,844,399, dated February 9, 1932.

The invention possesses other and further important objects and features, some of which, with the foregoing, will be set forth in the following description.

The invention, in a preferred form, is illustrated in the annexed drawing and hereinafter more fully described.

Figure 1:
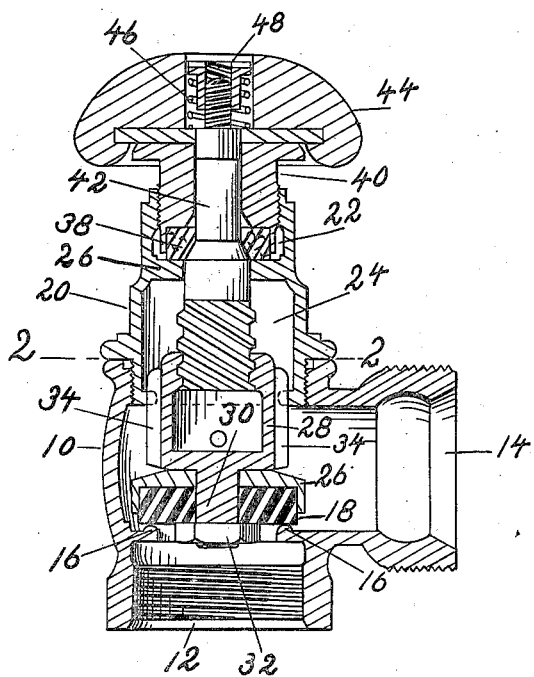
Figure 1 is a vertical sectional view of the valve of this invention.

The reference numeral 10, indicates in a general way a casing which has an inlet 12, and an outlet 14, with a seat 16, and a disk closure 18, therebetween.

A bonnet 20, is screw threadably secured to the upper portion of the casing 10. The bonnet is divided into an upper compartment 22, and a lower compartment 24 with an apertured dividing wall 26, therebetween.

Positioned on top of the disk closure 18, is a recessed apertured member 25, and a female screw threaded member 28. The threaded stem 30, which extends through the member 25, and the disk closure 18, with the cooperation of the nut 32, maintains the assembly in association.

Fins 34, on opposed sides of the member 28, operating in grooves 36, secure the member against rotation, yet permit the vertical movement of the assembled members and the disk closure.

Removably positioned in the upper compartment 22, of the bonnet 20, is an annular sealing member 38, having a tapered central sealing surface. The sealing member is secured in operable position by the recessed fitting 40, which in turn is threadably connected to the bonnet 20.

The lower face of the fitting 40, is recessed, as is best shown in Figure 1, to allow the annular sealing member 38, to be received therein and to prevent said member from spreading or becoming otherwise distorted.

It will also be noted that the lower portion of the aperture in the fitting 40, is of greater diameter than at the top, also that this aperture is tapered to conform with the tapered seat of the stem.

Positioned within the bonnet 20, and secured against longitudinal movement is a stem 42, the lower portion of which is threaded and in association with the threaded member 28. The stem 42, as is plainly shown in Figure 1, consists of a lower portion of one diameter and an upper portion of lesser diameter, with a tapered sealing surface therebetween. The entire tapered portion of the stem 42, is normally in contact with the sealing surface of the annular member 38.

Positioned on a square shank portion of the stem 42, is a hand wheel 44, which is there secured by the cooperative association of a helical spring 46, a nut 48, and the screw threaded top of the stem 42.

Figure 3:
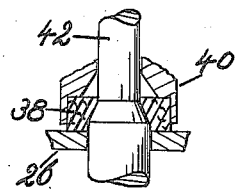
Figure 3 is a vertical sectional view of the sealing member, a portion of the stem and the lower portion of the recessed fitting, and shows the relative positions of each member after considerable wear.
Figure 2:
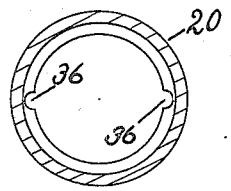
Figure 2 is a sectional view taken on the line 2—2 of Figure 1.

It will be apparent from the foregoing that rotation of the hand wheel will cause the disk closure assembly to raise and lower and it is equally obvious that such rotation will cause wear on the sealing surface of the annular sealing member. Such wear on the annular member will not cause leakage and require replacement of said member however, because the spring 46, and the nut 48, maintain the tapered sealing surfaces in engagement. It will be noted that the tapered portion of the stem may wear almost entirely through the annular member, as is best shown in Figure 3 before replacement of the part is necessary.

The annular sealing member 38, is preferably constructed of a laminated material such as phenol fiber. However, it will be obvious that any suitable material may be used.

It is further apparent from the foregoing that the sealing member may be easily replaced, without the use of special tools or without any particular skill or knowledge of the art. Moreover, the sealing members will remain in constant fluid tight relation regardless of weight or other outside influence on the hand wheel.

I am aware that many changes may be made, and numerous details of construction varied throughout a wide range without departing from the principles of this invention, and I, therefore, do not purpose limiting the patent granted hereon otherwise than as necessitated by the prior art.

I claim as my invention:

1. A packless valve including a casing, an inlet and an outlet passageway, a vertically movable closure member secured against rotation positioned between said inlet and outlet passageway, means for raising and lowering said closure, a bonnet threadably secured to the top of said casing, a stem operably associated with the closure member and extending upwardly through the bonnet, a tapered seat on the central portion of said stem, a removable non-compressible sealing member having a tapering aperture forming a seat corresponding with said first tapered seat and encircling said stem, an apertured recessed fitting extending downwardly into the bonnet and encircling said stem and said sealing member and preventing said sealing member from contacting the side walls of said bonnet, said fitting being adapted to be tightened against the sealing member without expanding said sealing member against the stem, the aperture in said fitting of greater diameter at one end than at the other, the lower part of said aperture being tapered to provide an auxiliary sealing surface for the tapered seat of said stem, and spring means for maintaining the tapered seats of said stem and said sealing member in fluid tight engagement.

2. A packless valve including a casing, an inlet and an outlet passageway through said casing, a vertically movable closure assembly between said inlet and said outlet, an apertured bonnet removably secured to the upper portion of the casing, said bonnet having an apertured dividing wall intermediate its ends, a stem operably associated with the closure assembly and extending upwardly through the bonnet, the upper portion of said stem being smaller in diameter than the lower portion and a tapered seat between said larger and said smaller portion, a recessed fitting in removable association with the upper portion of said bonnet, a non-compressible annular sealing member having a tapering aperture in engagement with said tapered seat removably secured within the upper part of said bonnet and against the upper surface of said dividing wall, said sealing member being positioned within and surrounded by portions of said recessed fitting and extending therebelow, said sealing member and said fitting being adapted to be tightened without exerting a pressure against the stem, and auxiliary means for preventing leakage when the seat portion of the stem wears through the annular sealing member.

3. In a packless valve, a casing, a bonnet removably secured to said casing, a stem within said casing and extending upwardly through said bonnet, a tapered seat on the central portion of said stem, an annular sealing member having a correspondingly tapered seat in fluid tight association with said tapered seat, a recessed fitting adapted to contact one face and a portion of the peripheral surface of said sealing member, said fitting being provided with an auxiliary sealing surface which is adapted upon wear of the annular sealing member to form a sealing engagement with the seat of said stem, the fitting being also adapted to be tightened against said annular sealing member without said sealing member tightening against the stem, and spring means for maintaining said seat of the stem in fluid tight association with the sealing member as said seat wears upwardly through said annular sealing member.

4. In a valve, a hollow body having openings therein and a seat positioned between the openings, a bonnet secured thereto and a fitting screw-threadedly secured within said bonnet and projecting thereabove, aligned openings through said bonnet and said fitting, the opening in said bonnet being of greater diameter than the opening in said fitting, the lower portion of the opening in said fitting being flared to a diameter equal to the diameter of the opening in the bonnet, a recess in said fitting, a non-yielding annular sealing member removably positioned within the recess in said fitting, the lower surface only of said sealing member being in engagement with said body, a stem positioned within the body and extending thereabove, a portion of the stem intermediate the ends thereof being of different diameters and having a tapered sealing surface therebetween, said tapered sealing surface being in sealing engagement with the non-yielding annular sealing member, means for urging the tapered sealing surface of the stem toward the tapered surface of the opening in the fitting, and means for opening and closing said valve.

5. A valve comprising a hollow body having openings thereto and a seat therein, an apertured bonnet removably secured thereto, an apertured fitting removably secured to the bonnet and forming therewith a recess, the lower portion of the aperture in said fitting being tapered to form an auxiliary sealing seat, an apertured sealing member positioned within said recess, said apertures being in alignment, a stem mounted in the bonnet and fitting and extending through said apertures and recess and having a shoulder engaging in the aperture of said sealing member, a handle mounted on the exposed end of the stem in slidable and non-rotatable relation thereto and engaging the exposed end of the fitting, a recess within the handle and a nut mounted on the stem within said recess and a spring mounted within the handle recess and supported between the handle and nut biased to move the handle and nut in opposite directions, an auxiliary stem socketed on the stem in threaded relation thereto and having means cooperating with means on the bonnet to permit slidable but non-rotatable relation between the bonnet and auxiliary stem, and means on the auxiliary stem to engage the body seat to close the valve.

EDWARD J. KILEY.